US012596753B2

(12) United States Patent
Gune et al.

(10) Patent No.: US 12,596,753 B2
(45) Date of Patent: Apr. 7, 2026

(54) COMPUTING PAGE RELEVANCE FOR TABULAR CONTENTS FROM A DOCUMENT

(71) Applicant: Schlumberger Technology Corporation, Sugar Land, TX (US)

(72) Inventors: Omkar Anil Gune, Pune (IN); Prashanth Pillai, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/884,320

(22) Filed: Sep. 13, 2024

(65) Prior Publication Data

US 2026/0080020 A1     Mar. 19, 2026

(51) Int. Cl.
*G06F 16/93* (2019.01)
(52) U.S. Cl.
CPC ................................... *G06F 16/93* (2019.01)
(58) Field of Classification Search
CPC ....................................................... G06F 16/93
See application file for complete search history.

(56) References Cited

U.S. PATENT DOCUMENTS

| | | | | |
|---|---|---|---|---|
| 2016/0267117 A1* | 9/2016 | Guggilla | ........... | G06F 16/24578 |
| | | | | 707/737 |
| 2021/0397595 A1* | 12/2021 | Roitman | ............... | G06F 16/285 |
| | | | | 707/737 |
| 2022/0121669 A1* | 4/2022 | Roitman | ............. | G06F 16/2282 |
| | | | | 707/737 |

| | | | | |
|---|---|---|---|---|
| 2022/0180402 A1* | 6/2022 | Mohaia | .................. | G06N 20/00 |
| | | | | 707/737 |
| 2022/0284722 A1* | 9/2022 | Periyakaruppan | ... | G06V 30/184 |
| | | | | 707/737 |
| 2023/0065915 A1* | 3/2023 | Berestovsky | ........... | G06F 18/22 |
| | | | | 707/737 |
| 2023/0134218 A1* | 5/2023 | Semenov | ................. | G06N 3/08 |
| | | | | 382/159 |
| 2023/0418867 A1* | 12/2023 | Prasad | .................... | G06F 16/81 |
| | | | | 707/737 |

(Continued)

OTHER PUBLICATIONS

Gune, O. A., et al., "Artificial Intelligence Assisted Deviation Survey Extraction from Well Reports", EAGE Digital 2024, Mar. 1, 2024, 4 pages.

*Primary Examiner* — Yuk Ting Choi
(74) *Attorney, Agent, or Firm* — Jeffrey D. Frantz

(57) ABSTRACT

A method computes page relevance for tabular contents from a document. The method includes receiving a table type and executing a term model to generate a term score of the page. The method further includes executing an embeddings model to generate an embeddings score of the page. The method further includes executing a summary model using a page summary generated with a language model to generate a summary score of the page. The method further includes executing a neighborhood model using a set of pages from the document to generate a neighborhood score of the page. The method further includes executing a combination model using the term score, the embeddings score, the summary score, and the neighborhood score to generate a combined score of the page. The method further includes presenting the combined score to indicate the page includes the table of the table type.

20 Claims, 9 Drawing Sheets

(56)                    References Cited

U.S. PATENT DOCUMENTS

| 2025/0005828 A1* | 1/2025 | Levins | G06Q 30/018 |
| | | | 707/737 |
| 2025/0103590 A1* | 3/2025 | Blyumen | G06F 16/2282 |
| | | | 707/737 |

* cited by examiner

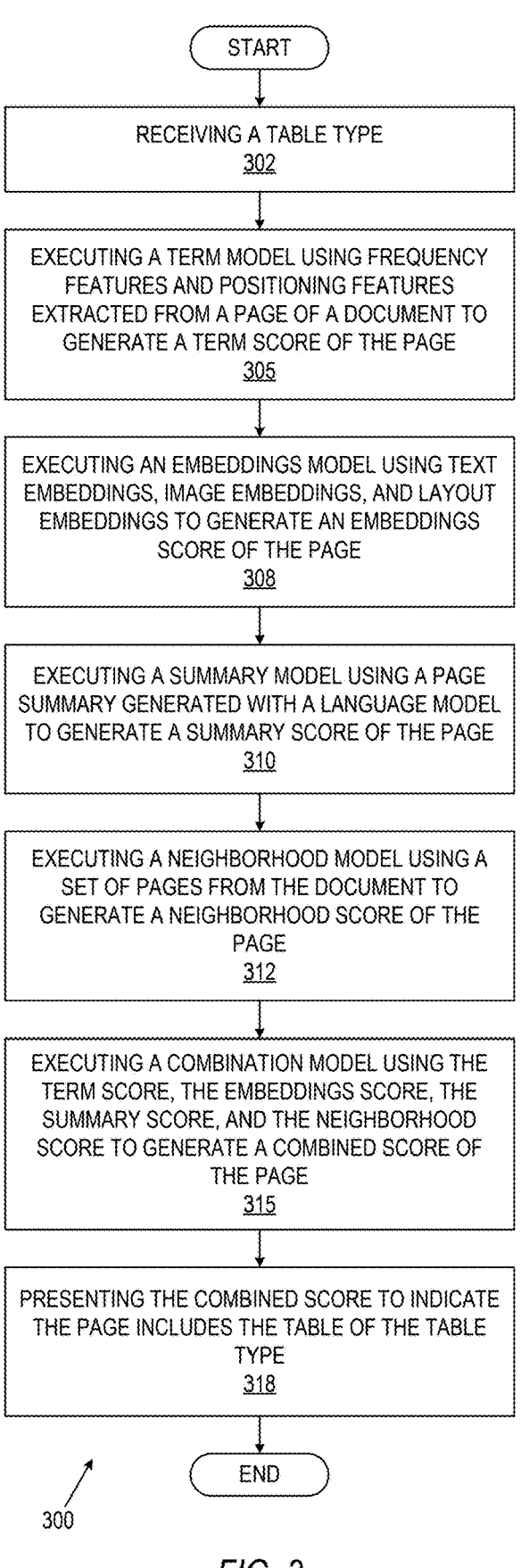

START

RECEIVING A TABLE TYPE
302

EXECUTING A TERM MODEL USING FREQUENCY
FEATURES AND POSITIONING FEATURES
EXTRACTED FROM A PAGE OF A DOCUMENT TO
GENERATE A TERM SCORE OF THE PAGE
305

EXECUTING AN EMBEDDINGS MODEL USING TEXT
EMBEDDINGS, IMAGE EMBEDDINGS, AND LAYOUT
EMBEDDINGS TO GENERATE AN EMBEDDINGS
SCORE OF THE PAGE
308

EXECUTING A SUMMARY MODEL USING A PAGE
SUMMARY GENERATED WITH A LANGUAGE MODEL
TO GENERATE A SUMMARY SCORE OF THE PAGE
310

EXECUTING A NEIGHBORHOOD MODEL USING A
SET OF PAGES FROM THE DOCUMENT TO
GENERATE A NEIGHBORHOOD SCORE OF THE
PAGE
312

EXECUTING A COMBINATION MODEL USING THE
TERM SCORE, THE EMBEDDINGS SCORE, THE
SUMMARY SCORE, AND THE NEIGHBORHOOD
SCORE TO GENERATE A COMBINED SCORE OF
THE PAGE
315

PRESENTING THE COMBINED SCORE TO INDICATE
THE PAGE INCLUDES THE TABLE OF THE TABLE
TYPE
318

END

$$TERM\ SCORE\ =\ f\left(\ Text\ based\ feature,\atop f\left(position\ based\ feature\right)\right)$$

EMBEDDINGS SCORE 652

Classifier 632

EMBEDDINGS MODEL 618

DNN (text based) TEXT MODEL 622

DNN (vision based) IMAGE MODEL 625

DNN (layout based) LAYOUT MODEL 628

Page Text 612

Page Image

Page Image 615

600

Page 602

718 — SUMMARY SCORE

715 — Classifier

712 — SUMMARY EMBEDDINGS

710 — Embedding network

708 — Page summary

705 — Language Model

702 — Page

700

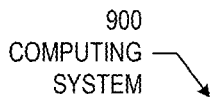
900
COMPUTING
SYSTEM
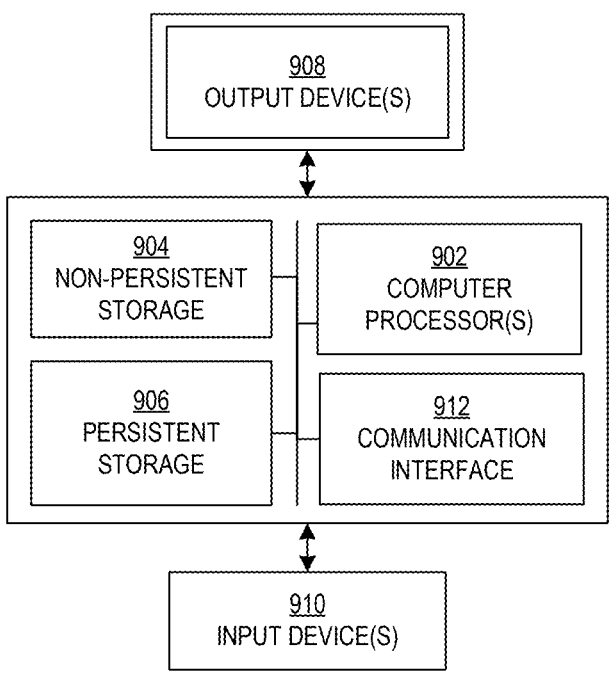
908
OUTPUT DEVICE(S)
904
NON-PERSISTENT
STORAGE
902
COMPUTER
PROCESSOR(S)
906
PERSISTENT
STORAGE
912
COMMUNICATION
INTERFACE
910
INPUT DEVICE(S)
*FIG. 9A*
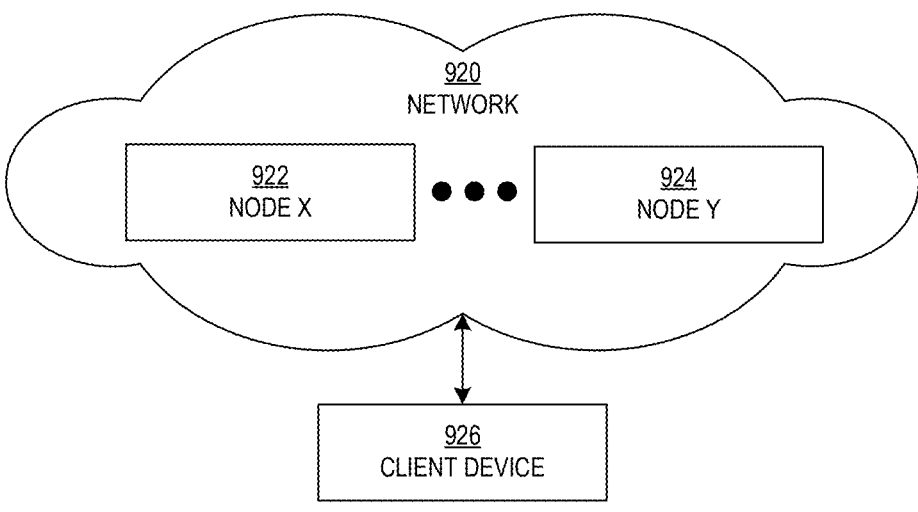
920
NETWORK
922
NODE X
924
NODE Y
926
CLIENT DEVICE
*FIG. 9B*

COMPUTING PAGE RELEVANCE FOR TABULAR CONTENTS FROM A DOCUMENT

BACKGROUND

Artificial intelligence (AI) techniques such as machine learning (ML) and deep learning (DL) may be used in document processing. Large amounts of data reside in the form of documents which contains variety of entities such as figures, tables, paragraphs, forms, etc. Automatic extraction of each of the above entities from documents can help in data ingestion and data segregation. A challenge is to identify the different entities from within the documents.

SUMMARY

In general, in one or more aspects, the disclosure relates to a method that computes page relevance for tabular contents from a document. The method includes receiving a table type. The method further includes executing a term model using frequency features and positioning features extracted from a page of a document to generate a term score of the page. The method further includes executing an embeddings model using text embeddings, image embeddings, and layout embeddings to generate an embeddings score of the page. The method further includes executing a summary model using a page summary generated with a language model to generate a summary score of the page. The method further includes executing a neighborhood model using a set of pages from the document to generate a neighborhood score of the page. The method further includes executing a combination model using the term score, the embeddings score, the summary score, and the neighborhood score to generate a combined score of the page. The combined score corresponds to a likelihood the page includes a table of the table type. The method further includes presenting the combined score to indicate the page includes the table of the table type.

In general, in one or more aspects, the disclosure relates to a system that includes at least one processor and an application that executes on the at least one processor. Executing the application performs receiving a table type. Executing the application further performs executing a term model using frequency features and positioning features extracted from a page of a document to generate a term score of the page. Executing the application further performs executing an embeddings model using text embeddings, image embeddings, and layout embeddings to generate an embeddings score of the page. Executing the application further performs executing a summary model using a page summary generated with a language model to generate a summary score of the page. Executing the application further performs executing a neighborhood model using a set of pages from the document to generate a neighborhood score of the page. Executing the application further performs executing a combination model using the term score, the embeddings score, the summary score, and the neighborhood score to generate a combined score of the page. The combined score corresponds to a likelihood the page includes a table of the table type. Executing the application further performs presenting the combined score to indicate the page includes the table of the table type.

In general, in one or more aspects, the disclosure relates to a non-transitory computer readable medium including instructions executable by at least one processor. Executing the instructions performs receiving a table type. Executing the instructions further performs executing a term model using frequency features and positioning features extracted from a page of a document to generate a term score of the page. Executing the instructions further performs executing an embeddings model using text embeddings, image embeddings, and layout embeddings to generate an embeddings score of the page. Executing the instructions further performs executing a summary model using a page summary generated with a language model to generate a summary score of the page. Executing the instructions further performs executing a neighborhood model using a set of pages from the document to generate a neighborhood score of the page. Executing the instructions further performs executing a combination model using the term score, the embeddings score, the summary score, and the neighborhood score to generate a combined score of the page. The combined score corresponds to a likelihood the page includes a table of the table type. Executing the instructions further performs presenting the combined score to indicate the page includes the table of the table type.

Other aspects of one or more embodiments may be apparent from the following description and the appended claims.

BRIEF DESCRIPTION OF DRAWINGS

FIG. 3 shows a flowchart in accordance with one or more embodiments of the disclosure.

FIG. 9A and FIG. 9B show computing systems in accordance with one or more embodiments.

Similar elements in the various figures are denoted by similar names and reference numerals. The features and elements described in one figure may extend to similarly named features and elements from different figures.

DETAILED DESCRIPTION

Embodiments of the disclosure implement a methodology for computing page relevance for tabular contents from a document. A set of documents may include domain based tabular content within the pages of the documents. The domain based tabular content (e.g., tables) display information in a tabular format using rows and columns on the pages of the documents. A user (a human or an automated process) may engage the system to determine whether a particular type of table is present within the documents. The presence of the table may be identified by the system with a page relevance quantified as a score.

The relevance may be computed by ranking the pages of the multipage documents. Pages ranked with higher scores are identified as containing tables or domain based tabular content specified by the user. Machine learning and deep learning techniques are used to perform page ranking to obtain multiple scores, which are then combined. A term score is obtained using the term frequency of attributes of user defined table and the spatial positions of these attributes in the page image. An embeddings score is obtained using a combination of text embeddings (of attributes from a user defined table), image embeddings (of a page image from a document), and layout embeddings (of the page image). A summary score is obtained by processing a summary of a page that may obtained using various natural language processing (NLP) techniques such as using large language models. A neighborhood score is obtained using the embeddings of the neighborhood pages (e.g., a group of adjacent pages). The term score, the embeddings score, the summary score, and the neighborhood score are combined to form a combined score. The combined score provides an indication of whether a page of a document includes a table of the type specified by the user.

Figure 1:
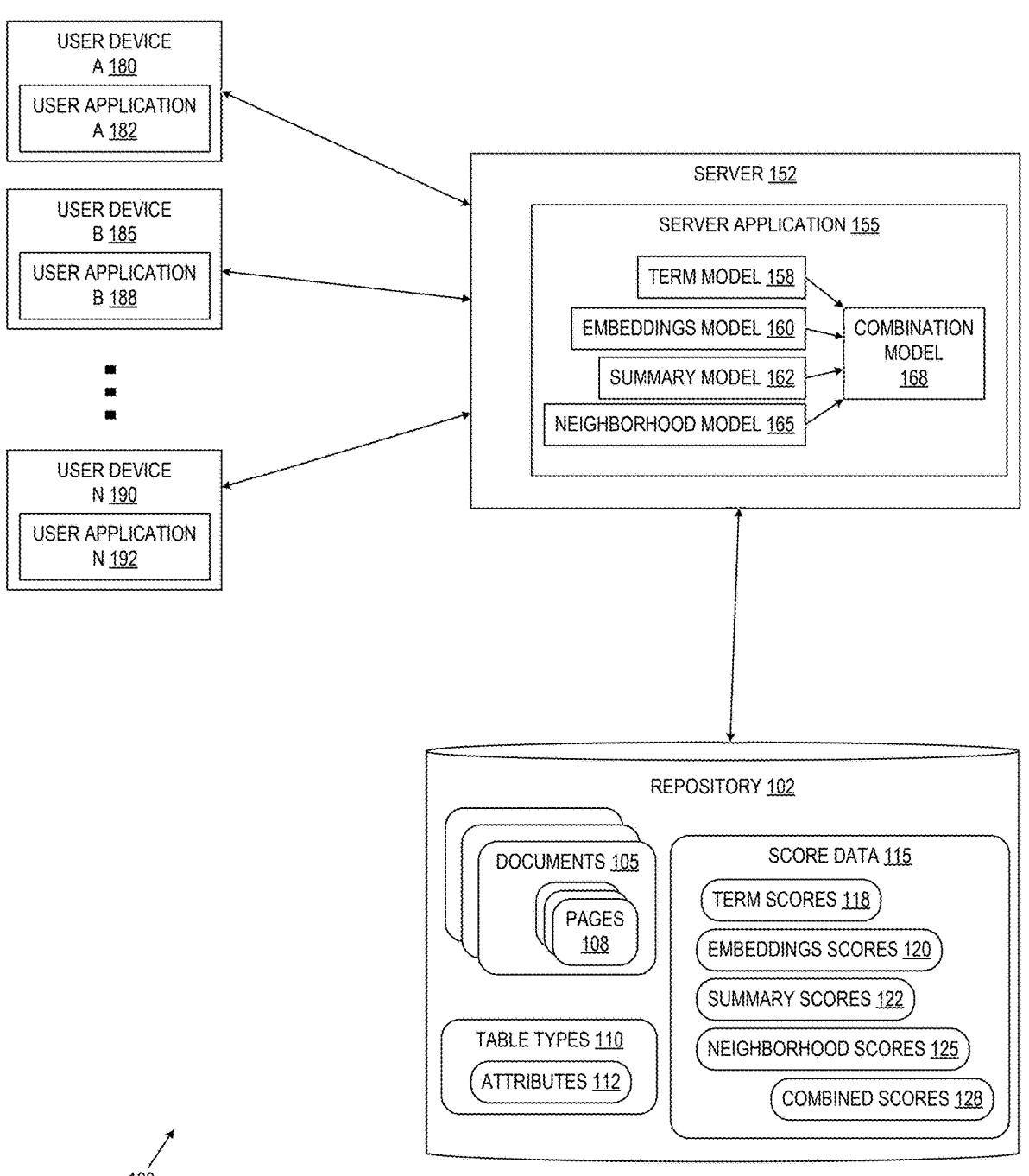
FIG. 1 and FIG. 2 show diagrams in accordance with one or more embodiments of the disclosure.

Turning to FIG. 1, the system (100) implements a methodology for computing scores that identify the presence of domain based tabular content within documents. The system (100) includes multiple hardware and software components to specify and process the documents (102) to generate the combined scores (128) to identify the pages (108) from the documents (105) that include tables that are in accordance with the table types (110). The system (100) includes the repository (102), the server (152), and the user devices A (180) and B (185) through N (190).

The repository (102) is a collection of components that store the data used by the system (100). The repository (102) includes storage units and devices such as file systems, databases, data structures, etc. that store the data used by the system (100). The repository (102) may include multiple different, potentially heterogenous, storage units and devices and may store data utilized by other components of the system (100). The data stored by the repository (102) may include the documents (105), the table types (110), and the score data (115).

The documents (105) are collections of data that represent information that can be read by humans or processed by machines. The documents (105) may each include multiple entities such as text, paragraphs, figures, domain based tabular content (i.e., tables), forms, etc. Each of the documents (105) may include one or more pages (108).

The pages (108) are collections of data that compartmentalize the information from one of the documents (105). A page is a defined segment of a document that may correspond to a printed page of information, a screen of information, a window of information, etc. One page may include one or more tables or portions of tables. A table may be spread over multiple pages.

The table types (110) are collections of data that define different types of tables that may be present in the pages (108) of the documents (105). The table types (110) may include schemas that define the attributes (112) for different types of tables.

The attributes (112) are collections of data that may specify information that may be included within a table. As an example, the attributes (112) may include column names. The column names may include labels used in the headers for the columns of the tables in one of the pages (108). Other types of information may be included in the attributes (112).

The score data (115) is a collection of data that includes the scores generated by the models used by the system (100). The score data (115) includes the term scores (118), the embeddings scores (120), the summary scores (122), the neighborhood scores (125), and the combined scores (128).

The term scores (118) are collections of data generated by the term model (158). The term scores (118) represent predictions from the term model (158) of the likelihood that the pages (108) include tables that correspond to the attributes (112).

The embeddings scores (120) are collections of data generated by the embeddings model (160). The embeddings scores (120) represent predictions from the embeddings model (160) of the likelihood that the pages (108) include tables that correspond to the attributes (112).

The summary scores (122) are collections of data generated by the summary model (162). The summary scores (122) represent predictions from the summary model (162) of the likelihood that the pages (108) include tables that correspond to the attributes (112).

The neighborhood scores (125) are collections of data generated by the neighborhood model (165). The neighborhood scores (125) represent predictions from the neighborhood model (165) of the likelihood that the pages (108) include tables that correspond to the attributes (112).

The combined scores (128) are collections of data generated by the combination model (168). The combined scores (128) represent predictions from the combination model (168) of the likelihood that the pages (108) include tables that correspond to the attributes (112).

The server (152) is a collection of hardware components that processes data within this system (100). The server (152) interacts with the user devices A (180) through N (190) to process data retrieved from and stored to the repository (102). The server (152) may be an embodiment of the computing systems described in FIG. 9A and FIG. 9B. The server (152) may be one computing system in a cloud computing environment that hosts applications utilized by the system (100). The server (152) may include at least one processor and one or more memories to execute the programs utilized by the system (100). The server (152) hosts the server application (155).

The server application (155) is a collection of programs that execute to perform operations of the system (100). The server application (155) may load data from the repository (102), process the data with multiple models, and store the results back to the repository (102) as the score data (115). The server application (155) may execute the term model (158), the embeddings model (160), the summary model (162), the neighborhood model (165), and the combination model (168).

Each of the term model (158), the embeddings model (160), the summary model (162), the neighborhood model (165), and the combination model (168) may include one or more machine learning models. The machine learning models used by the system (100) may include neural networks and may operate using one or more layers of weights that are sequentially applied to sets of input data, which may be referred to as input vectors. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model. Multiple machine learning models may operate sequentially or in parallel. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model.

The machine learning models may be trained by inputting training data to a machine learning model to generate training outputs that are compared to expected outputs. For supervised training the expected outputs may be labels associated with a given input. For unsupervised learning, the expected outputs may be previous outputs from the machine learning model. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

The term model (158) is a collection of programs that may execute as part of the server application (155). The term model (158) processes the pages (108) from the documents (105) to generate the term scores (118), which may be the input to the combination model (168).

The embeddings model (160) is a collection of programs that may execute as part of the server application (155). The embeddings model (160) processes the pages (108) of the documents (105) to generate the embeddings scores (120), which may be input to the combination model (168).

The summary model (162) is a collection of programs that may execute as part of the server application (155). The summary model (162) processes the pages (108) of the documents (105) to generate the summary scores (122), which may be input to the combination model (168).

The neighborhood model (165) is a collection of programs that may execute as part of the server application (155). The neighborhood model (165) processes the pages (108) of the documents (105) to generate the neighborhood scores (125), which may be input to the combination model (168).

Continuing with FIG. 1, the user devices A (180) and B (185) through N (190) may interact with the server (152). The user devices A (180) and B (185) through N (190) may be computing systems in accordance with FIG. 6A and FIG. 6B. The user devices A (180) and B (185) through N (190) may include and execute the user applications A (182) and B (188) through N (192).

The user applications A (182) and B (188) through N (192) are programs that operate on the user devices A (180) and B (185) through N (190) to provide user interaction by collecting user inputs and displaying outputs in response to the user inputs. The user applications A (182) and B (188) through N (192) may include user interfaces with user interface elements to receive inputs and display outputs to users of the system (100).

The user devices A (180) and B (185) may be operated by users to select the documents (105) and the table types (110), which are processed by the server application (155), to generate the combined scores (128). The combined scores (128) may be presented to and displayed by the user devices A (180) and B (185).

The user device N (190) may be operated by a developer to train and deploy the models utilized by the system (100). One or more of the term model (158), the embeddings model (160), the summary model (162), the neighborhood model (165), and the combination model (168) may be selected to be trained. The models may be trained independently or in combination. After the models are trained, the models may be deployed and instantiated to the server (152) responsive to commands from the user device N (190).

Although described within the context of a client server environment with servers and user devices, aspects of the disclosure may be practiced with a single computing system and application. For example, a monolithic application may operate on a computing system to perform the same functions as one or more of the applications executed by the server (152) and the user devices A (180) and B (185) through N (190).

Figure 2:
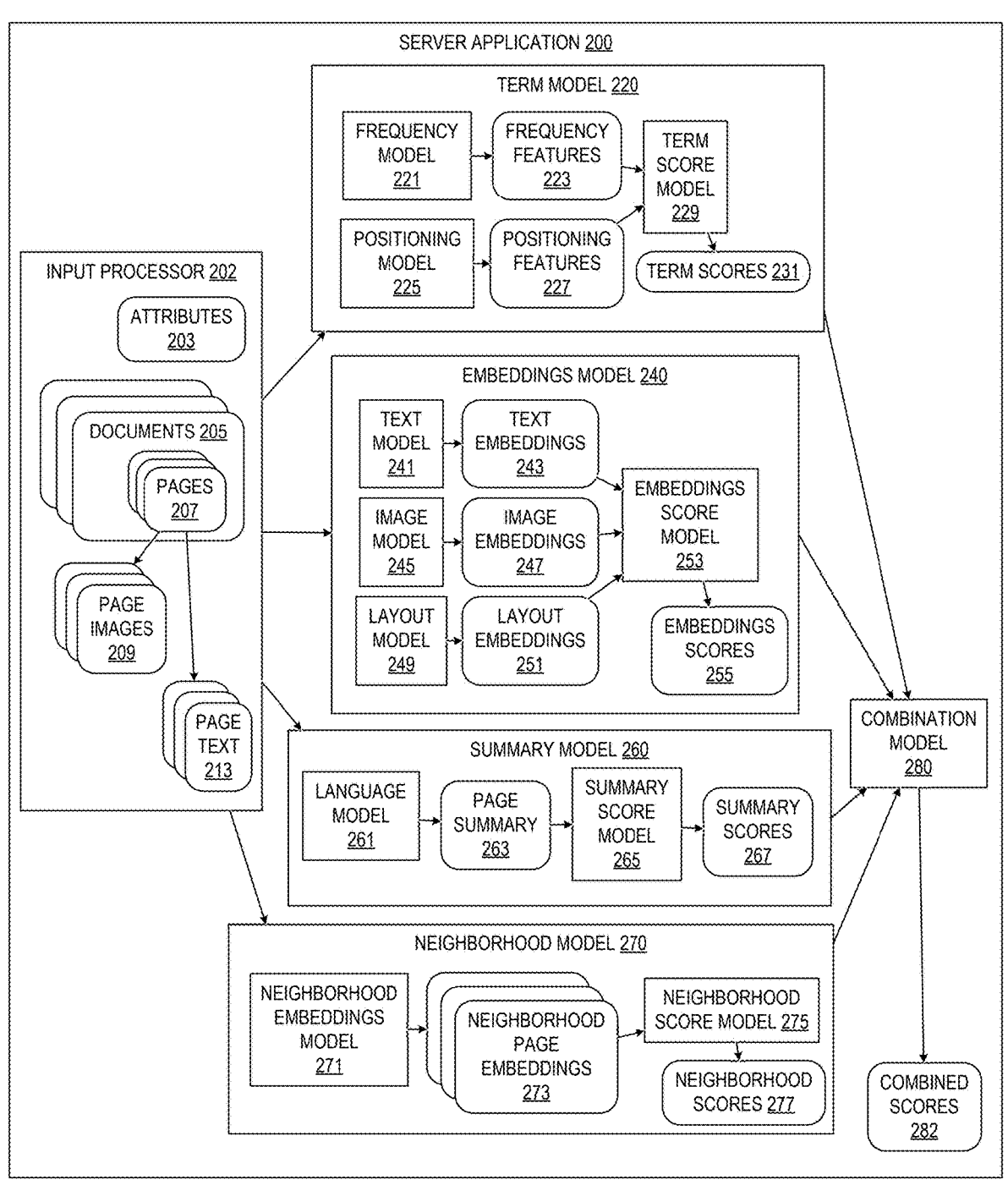

Turning to FIG. 2, the server application (200) may be an implementation of the server application (155) of FIG. 1. The server application (200) processes one of the pages (207) to generate the combined score (282). The server application (200) utilizes multiple programs, which may implement multiple machine learning models, and includes the input processor (202), the term model (220), the embeddings model (240), the summary model (260), the neighborhood model (270), and the combination model (280).

The input processor (202) is a collection of programs that processes inputs to the server application (200) to convert the inputs to a form that may be used by the other components of the server application (200). The information collected by the input processor (202) are the inputs to the server application (200), which may include the attributes (203) and the documents (205). From the documents (205), the page images (209) and the page text (213) may be extracted. The input processor (202) may send combinations of the attributes (203), the page images (209), and the page text (213) to other components of the server application (200) from which scores are generated, which may be combined to form the combined scores (282).

The attributes (203) are collections of data that may be used to identify tables from the pages (207). The attributes (203) may be selected by a user and loaded from a repository.

The documents (205) are collections of data that include the pages (207). The documents (205) may be selected by user and loaded from a repository.

The pages (207) are collections of data within the documents (205). Each of the pages (207) may include one or more tables that may correspond to the attributes (203).

The page images (209) are collections of data extracted from the pages (207). One of the page images (209) may be a visual representation of the information from one of the pages (207).

The page text (213) is text extracted from the pages (207). One collection of text within the page text (213) may correspond to one of the pages (207). The page text (213) may be extracted from the page images (209) using an optical character recognition model that processes the page images (209) to output the page text (213).

The term model (220) is a collection of programs that generate the term scores (231) from the attributes (203), the page images (209), and the page text (213) for the pages (207) from one of the documents (205). One of the term scores (231) may be generated for one of the pages (207). The term model (220) processes input using the frequency model (221), the positioning model (225), and the term score model (229).

The frequency model (221) is a collection of programs that may process the attributes (203) and the page text (213) to generate the frequency features (223). The frequency model (221) may be a term frequency, inverse document frequency (TF/IDF) model. For example, for each of the terms identified as column names from the attributes (203), the frequency model may calculate the term frequency and inverse document frequency, which may be output as part of the frequency features (223). The output of the frequency model (221) may be the term frequencies divided by the inverse document frequencies for each of the column names from the attributes (203). The term frequency may measure the frequency of a term in a page and be calculated as the number of times a term appears in the page divided by the total number of words in the page. The inverse document frequency may measure the uniqueness of a term with respect to a collection of pages (i.e., one of the documents (205)) with lower values for terms that appear more frequently in a document and higher values for terms that appear less frequently.

The frequency features (223) are collections of data output from the frequency model (221). The frequency features (223) identify the frequencies for the terms from the attributes (203) that are used within the pages (207) of the documents (205). The frequency features (223) are an input to the term score model (229).

The positioning model (225) is a collection of programs that may process the attributes (203) with the page images (209) to generate the position features (227). The positioning model (225) may identify the location (e.g., x, y coordinates) of the attributes (203) that may be found within the page images (209). The location of the terms within the pages images (209) may be identified with an optical character recognition model. The positioning model (225) may generate a vector with coordinates for each of the terms from the attributes (203) that are found within one of the page images (209), which may form the positioning features (227). The positioning model (225) may output the positioning features (227), which may include a scalar value describing the spread of y coordinates of the attributes (203) and may include a scalar value describing the spread of x coordinates of the attributes (203). As an example, the spread of y coordinates may be calculated by averaging the y coordinates of the terms from the attributes (203). Similarly, the spread of x coordinates may be calculated by averaging the x coordinates of the terms from the attributes (203). One or more of the spread of y coordinates and the spread of x coordinates may be included in the positioning features (227).

The positioning features (227) are output from the positioning model (225). The positioning features (227) are collections of data that identify the locations of the terms from the attributes (203) that are found within the page images (209). One of the positioning features (227) may be a scalar indicating the vertical (y coordinate) or horizontal (x coordinate) spread of the x or y coordinates of the attributes (203). The positioning features (227) are an input to the term score model (229).

The term score model (229) processes the frequency features (223) and the positioning features (227) to generate the term scores (231). The term score model (229) may use multiple thresholds to process the frequency features (223) and the positioning features (227). If a threshold number of features from the frequency features (223) are above a threshold level then the term score model (229) may process the positioning features (227) to determine if one or more of the vertical and horizontal spreads of the locations of the terms are below a corresponding threshold to generate a term score for one of the pages (207). Additionally, the term score model (229) may process frequency features (223) and positioning features (227) independently, and later combine them (by addition, averaging, etc.) together to generate one of the term scores (231). Alternative embodiments may use different models, for example, a neural network may be used that applies a perceptron model to the frequency features (223) and the positioning features (227) to generate the term scores (231).

The term scores (231) are collections of data that identify the likelihood that one of the pages (207) includes a table specified by the attributes (203). The term scores (231) may be output from the term model (220) as an input to the combination model (280).

The embeddings model (240) is a collection of programs that processes the attributes (203), the page images (209), and the page text (213) to generate the embeddings scores (255). The embeddings model (240) includes the text model (241), the image model (245), and the layout model (249) to process the page images (209) and the page text (213).

The text model (241) is a collection of programs that processes the page text (213) to output the text embeddings (243). The text model (241) may be an embeddings model that tokenizes the page text (213) and converts the tokens to embedding vectors, which form the text embeddings (243). A token may be a sequence of one or more characters from the page text (213) which may form a word or symbol of natural language. The text model (241) may convert each token extracted from the page text (213) to a vector (referred to as a word vector) that represents the semantic meaning of the token in a latent space. The vectors generated from the tokens from the page text (213) form the text embeddings (243).

The text embeddings (243) are collections of data generated by the text model (241). The text embeddings (243) may use vectors to represent the semantic meaning of the words from the page text (213) in a latent space in which words with similar meaning may have vectors with similar values. The text embeddings (243) may be input to the embeddings score (253).

The image model (245) is a set of programs that process the page images (209) to generate the image embeddings (247). The image model (245) may include one or more machine learning models, which may include convolutional neural networks, transformers, vision transformers, recurrent networks, etc. The output of the image model (245) is a collection of vectors that forms the image embeddings (247).

The image embeddings (247) are collections of data that may identify features within the page images (209). The image embeddings (247) may not be in the same latent space as the text embeddings (243) and may have different dimensionality than the dimensionality of text embeddings (243). The image embeddings (247) may be transformed to be in the same space as the text embeddings (243). The image embeddings (247) may describe the content of the images within the page images (209). The image embeddings (247) are an input to the embeddings score model (253).

The layout model (249) is a collection of programs that also processes the page images (209), but generates the layout embeddings (251). The layout model (249) may have a similar architecture as the image model (245), but may have different parameters and weights to produce different results. The layout model (249) may have a different architecture (number and type of layers) from the image model (245) but operate on similar inputs to generate output with similar dimensions as the output from the image model (245).

The layout embeddings (251) are the outputs from the layout model (249). The layout embeddings (251) may not be in the same latent space as the text embeddings (243). The layout embeddings (251) may include features that identify the structure (i.e., the layout) of the information contained in the page images (209). The layout embeddings (251) are input to the embeddings score (253).

The embeddings score model (253) is a collection of programs that process the text embeddings (243), the image embeddings (247), and the layout embeddings (251) to generate the embeddings scores (255). The embeddings score model (253) may use the text model (241) to generate embeddings for the attributes (203). The embeddings for the attributes (203) may be treated as ground truth embeddings to which the embeddings for the page summary (263) may be compared and combined to generate the summary scores (267). The embeddings for the attributes (203) may then be compared with the text embeddings (243), the image embeddings (247), and the layout embeddings (251). The embeddings score model may include a perceptron model that outputs the embeddings scores (255) from the embeddings for the attributes (203), the text embeddings (243), the image embeddings (247), and the layout embeddings (251).

The embeddings scores (255) are collections of data that identify the likelihood that the pages (207) include tables identified by the attributes (203). One of the embeddings scores (255) may be generated for one of the pages (207). The embeddings scores (255) may be output from the embeddings model (240) as an input to the combination model (280).

The summary model (260) is a collection of programs that processes the page text (213) to generate the summary scores (267). The summary model (260) uses the language model (261) and the summary score model (265).

The language model (261) is a collection of programs that processes the page text (213) to generate the page summary (263). The language model (261) may be a large language model that has been pretrained to generate outputs in response to a prompt. The prompt used as an input to the language model (261), may include the page text (213) with instructions to generate a summary for a portion of the page text (213) that corresponds to one of the pages (207). The input to and the output from the language model (261) may be text. The input to and the output from the language model may be sequences of embeddings vectors that correspond to text. The embeddings vectors may be generated with the text model (241) or with a different model that generates embeddings vectors in a semantic space from text.

The page summary (263) is the output from the language model (261). The page summary (263) is a summary of one of the pages (207). The page summary (263) may have fewer words for the page than the number of words in the collection of text from the page text (213) that corresponds to the same page. The page summary (263) is input to the summary score model (265).

The summary score model (265) is a collection of programs that processes the page summary (263) to output the summary scores (267). The summary score model (265) may compare embeddings for the page summary (263) with embeddings for the attributes (203) to generate the summary scores (267). The embeddings processed with the summary score model (265) may be generated with the text model (241), or with a different embeddings model. The summary score model (265) may include a perceptron model that generates the summary scores (267) as the sum of products of parameters multiplied by the embeddings for the attributes (203) and the page summary (263). The summary scores (267) are the outputs from the summary scores model (265). The summary scores (267) may identify the likelihood that one of the pages (207) includes a table that corresponds to the attributes (203). The summary scores (267) may be an output from the summary model (260) that is input to the combination model (280).

The neighborhood model (270) is a collection of programs that may process multiple pages (207) from one of the documents (205) to generate the neighborhood scores (277).

The neighborhood model (270) may process multiple pages (207) to generate one of the neighborhood scores (277).

The neighborhood embeddings model (271) is a collection of programs that processes information from the pages (207) to generate the neighborhood page embeddings (273). The neighborhood embeddings model (271) may select pages that are near or adjacent to a current page which are then processed to eventually form the neighborhood scores (277). For example, the neighborhood embeddings model (271) may select a set of contiguous pages from the pages (207) in which the current page being processed by the other models, (such as the term model (220), the embeddings model (240), and the summary model (260) may be the first page of the set of contiguous pages, one of the middle pages of the set of contiguous pages, or the last page of the set of contiguous pages. The neighborhood embeddings model (271) may collect the intermediate values from the other models of the system. The neighborhood embeddings model (371) may collect one or more of the frequency features (223), the positioning features (227), the text embeddings (243), the images embeddings (247), the layout embeddings (251), and the page summary (263) from one or more of the term model (220), the embeddings model (240), and the summary model (260) for each of the pages in the set of contiguous pages being analyzed by the neighborhood embeddings model (271).

The neighborhood page embeddings (273) are collections of data output from the neighborhood embeddings model (271). The neighborhood page embeddings (273) includes collections of embeddings for each of the pages for the set of contiguous pages being processed with the neighborhood embeddings model (271). The neighborhood page embeddings (273) may also include the scores generated for the other pages, which may include the term scores (231), the embeddings scores (255), and the summary scores (267). The neighborhood page embeddings (273) are input to the neighborhood score model (275).

The neighborhood score model (275) is a collection of programs that processes the neighborhood page embeddings (273) to generate the neighborhood scores (277). One of the neighborhood scores (277) may be generated for each set of contiguous pages, analyzed with the neighborhood embeddings model (271). The neighborhood score model (275) may use known models to further process the neighborhood page embeddings to generate the neighborhood scores (277). For example, additional attention layers, transformer models, perceptron models may be applied to the neighborhood page embeddings (273).

The neighborhood scores (277) are collections of data that identify the likelihood that the pages (207) include a table that corresponds to the attributes (203). The neighborhood scores (277) may include scalar values for each of the pages (207). The neighborhood scores (277) may be an output of the neighborhood model (270) that is input to the combination model (280).

The combination model (280) is a collection of programs that combines the outputs from the term model (220), the embeddings model (240), the summary model (260), and the neighborhood model (270) to generate the combined scores (282). Each of the inputs to the combination model (280) may be a scalar value that corresponds to one of the pages (207). The combination model (280) may include a perceptron model that combines the inputs to form the combined scores (282) as an output. The combination model (280) may utilize a weighted combination of inputs to form the combined scores (282).

The combined scores (282) are the output from the combination model (280). Each of the combined scores (282) corresponds to one of the pages (207) from the documents (205). The combined scores (282) identify a likelihood that one of the pages (207) corresponds to the attributes (203). The combined scores (282) may be more accurate than the individual scores from which the combined scores (282) are generated.

FIG. 3 shows a flowchart of a method for computing page relevance for tabular content from a document, in accordance with one or more embodiments. The method of FIG. 3 may be implemented using the system of FIG. 1, and one or more of the steps may be performed on, or received at, one or more computer processors. A system may include at least one processor and an application that, when executing on the at least one processor, performs the method. A non-transitory computer readable medium may include instructions that, when executed by one or more processors, perform the method. The outputs from various components (including models, functions, procedures, programs, processors, etc.) performing the method may be generated by applying a transformation to inputs using the components to create the outputs without using mental processes or human activities.

Turning to FIG. 3, the process (300) may be part of an application that computes page relevance for tabular content from a document. The process (300) may include multiple steps (e.g., steps 302 through 318) that may execute on the components described in the other figures, including those of FIG. 1.

Block 302 includes receiving a table type. The table type identifies the type of the table to consider when processing documents and may be received from a user device.

Receiving the table type may include receiving a schema defining a set of attributes of the table type. The schema may include names for columns and a name for the type of the table. The schema may be stored as a file that is loaded into memory for processing.

Receiving the table type may include receiving a natural language query identifying a set of attributes of the table type. The natural language query may be a sentence input from a user that describes the type of table to identify within the pages of the documents being processed by the system. As an example, the natural language query "identify the flow rate tables that include columns for oil, water, and gas over time in the document at [URL]", when received by the system triggers the system to load the document from the specified URL and identify pages from within the document that include tables with attributes that may be identified as "flow rate tables" and that may include columns with names related to the flow of oil, water, and gas overtime.

Block 305 includes executing a term model using frequency features and positioning features extracted from a page of a document to generate a term score of the page. For a page of a document, the term model may receive a page image and page text. The page image includes a visual representation of the information from the page and the page text includes text that may be extracted from the page or it may be extracted from the page image using an optical character recognition model. The term model processes the page image and the page text for a page to generate the term score for the page.

Executing the term model may include executing a frequency model using page text and a set of attributes of the table type to extract the frequency features from the page. The frequency model may be a model that is part of the term model that identifies the term frequencies and inverse document frequencies for each of the terms from the attributes describing the table. The term frequency may be divided by the inverse document frequency for each term to generate a value for each term with the values for the multiple terms being collected into a vector of values. The vector of values forms the frequency features that are output by the frequency model.

Executing the term model may include executing a positioning model using a page image and the set of attributes of the table type to extract the positioning features from the page. The positioning model processes the attributes identifying a table with a page image for a page. The positioning model may identify the location within the page image for each of the terms from the attributes describing the table. The output of the positioning model, referred to as positioning features, may include coordinates for the locations for each of the terms of the attributes for the table that may be found within the page being processed by the system. The coordinates may include XY coordinates for each of the terms.

Executing the term model may include executing a term score model with the frequency features and the positioning features to generate the term score. The term score model generates a combination of frequency features and positioning features to compute a term score for a page of a document. The term score model may use multiple thresholds with the frequency features and the positioning features to compute the term score. If a threshold number of frequency features (i.e., a feature threshold) includes values that are greater than a threshold amount (i.e., a value threshold), then then the term score may be set to a value of 1 when the range of Y coordinates is less than a range threshold or set to a value of 0 otherwise. For example, when the frequency threshold of "5" and the value threshold of "0.3" are both met, then at least five of the frequency features have a value of at least "0.3" and the range of Y coordinate values may be compared to the arranged threshold. The range threshold may identify the range as the height of a number of lines of text so that if the range of Y coordinate values is less than the height of number of lines of text, then the term score may be set to 1 when the frequency threshold and the value threshold are also met. The number of lines may be three lines of text, five lines of text, etc. In another embodiment, the term score model may be a classifier model that may incorporate one or more perceptron layers that are used to analyze the frequency features and the position features. For a layer, the parameters from the perceptron layers are multiplied to the frequency features and the positioning features with the resulting products being summed, with the summation from the final layer being the term scorer output from the term score model.

Block 308 includes executing an embeddings model using text embeddings, image embeddings, and layout embeddings to generate an embeddings score of the page. The embeddings model may utilize multiple different machine learning models that may utilize different inputs to produce different outputs.

Executing the embeddings model may include executing a text model using page text to extract the text embeddings from the page. The page text is input to the text model, which converts the text to tokens and then to vectors that represent the semantic meaning of the information from the page text.

Executing the embeddings model may include executing an image model using a page image to extract the image embeddings from the page. The page image is input to the image model which may generate a sequence of vectors that represents the content from the page image. The sequence of vectors may form the image embeddings output by the image model. Each of the vectors of the sequence of vectors may not be in the same semantic space as the vectors generated by the text model. Each of the vectors of the sequence of vectors may be transformed such that the transformed vectors may be in the same semantic space as the vectors generated by the text model. The sequence of text vectors may be mapped to tokens, which may be mapped to words and characters to form a natural language sentence that describes the content of the page image.

Executing the embeddings model may include executing a layout model using the page image to extract the layout embeddings from the page. The page image is input to the layout model, which may generate a sequence of vectors that represents the layout of the content from the page image. The sequence of vectors may form the layout embeddings output by the layout model. Each of the vectors in the sequence of vectors may not be in the same semantic space as the vectors generated by the text model. Each of the vectors in the sequence of vectors may be transformed such that the transformed vectors may be in the same semantic space as the vectors generated by the text model. The sequence of text vectors may be mapped to tokens, which may be mapped to words and characters to form a natural language sentence that describes the layout of the content of the page image.

Executing the embeddings model may include executing an embeddings score model with the text embeddings, the image embeddings, and the layout embeddings to generate the embeddings score. The embeddings score model combines the text embeddings, the image embeddings, and the layout embeddings for a page to generate an embeddings score for the page of a document. The embeddings score model may include a perceptron model that outputs a classification as a scalar value for the embeddings score. Additional layers of different types of tables may be included, such as attention layers, transformer layers, convolutional layers, pooling layers, etc.

Executing the embeddings model may include executing a text model using a set of attributes of the table type to generate attribute embeddings. The attribute embeddings may be in the same latent space as the text embeddings generated from the page text and have similar semantic meaning.

Executing the embeddings model may include executing an embeddings score model to compare the attribute embeddings to one or more of the text embeddings, the image embeddings, and the layout embeddings to the attribute embeddings to generate the embeddings score. The comparison may be performed by calculating the cosine similarity between the attribute embeddings and one or more of the text embeddings, the image embeddings, and the layout embeddings. The multiple similarity scores may then be combined to form the embeddings score that is output by the embeddings model. The combination may be an average, a weighted average, etc.

Block 310 includes executing a summary model using a page summary generated with a language model to generate a summary score of the page. The input to the summary model may include text embeddings generated with the text model used by the embeddings model to generate the embeddings score for the page. The text embeddings may be combined with embeddings for a prompt to the language model that causes the language model to generate a summary of the page text from which the text embeddings were extracted.

Executing the summary model may include executing the language model with page text to generate the page summary. The language model may be a pretrained model and may accept input as either text or embeddings and then output embeddings or text. The input to the language model may be referred to as a prompt, which may include text (or embeddings) extracted from a page of a document. The prompt may also include instructions to the language model to generate the summary. The language model may apply multiple transformer and attention layers to the input to generate an output that is responsive to instructions within the prompt that includes a summary of the page, referred to as a page summary. The page summary may be in the form of text or embeddings (i.e., vectors). Embeddings from the page summary may be used as input to a summary score model.

Executing the summary model may include executing a summary score model with the page summary to generate the summary score. The summary score model may process the page summary by determining the similarity between embeddings for the page summary and the embeddings for the attributes (i.e., the attribute embeddings, which may be treated as ground truth embeddings) that identify the table type selected by the user of the system. The similarity may be calculated as the cosine similarity to return a scalar value as the summary score.

Block 312 includes executing a neighborhood model using a set of pages from the document to generate a neighborhood score of the page. A set of pages may be contiguous and adjacent to a current page that is being processed from a document. The intermediate values and scores generated by the other models (including the term model, the embeddings model, and the summary model) for the pages may be collected by the neighborhood model and processed to generate a neighborhood score for a page being processed.

Executing the neighborhood model may include selecting the set of pages from the document. The set of pages selected from the document may be specified as a parameter of the neighborhood model. For a current page, the set of pages to be processed by the neighborhood model, with respect to the current page, may include one or more pages before or after the current page. The current page may be the first page of a set of pages or may be the last page of a set of pages.

Executing the neighborhood model may include executing a neighborhood embeddings model with the set of pages to generate a set of neighborhood page embeddings. The neighborhood page embeddings for a page of the set of pages, may include one or more of the frequency features, the positioning features, the text embeddings, the image embeddings, the layout embeddings, the page summary, the term score, the embeddings score, and the summary score generated for the page by the other models.

Executing the neighborhood model may include executing a neighborhood score model with the set of neighborhood page embeddings to generate the neighborhood score. The neighborhood page embeddings are combined by the neighborhood score model to generate the neighborhood score for the page. The combination may be performed with a perceptron model that combines the neighborhood page embeddings using one or more sequential perceptron layers to generate a scalar output.

Block 315 includes executing a combination model using the term score, the embeddings score, the summary score, and the neighborhood score to generate a combined score of the page, wherein the combined score corresponds to a likelihood the page includes a table of the table type. The combination model may combine the scores using mathematical transformations, which may include machine learning models. The combination may be an average, a weighted average, etc. The combination model may include a perceptron model that multiplies parameters to the scores and then sums the product to generate a combined score for a page of a document.

Block 318 includes presenting the combined score to indicate the page includes the table of the table type. The combined score may be presented by transmitting the combined score to a computing device. The computing device may display the combined score with the page to a user of the computing device. The combined score may be used by another process to trigger the extraction of the table from the page for storage to a repository.

The process (200) further includes extracting the page from the document to a page image. The document may be in the form of a text file, an object file, a binary file, an image file, etc. The page may be rendered from the document to generate a visual image that is stored as the page image. The document itself may store the pages as visual images, which may be extracted.

The process (200) further includes extracting page text from the page image. The document may be rendered to a visual image which is processed by an optical character recognition model that identifies the text within the visual image as well as the location of the text within the visual image.

The system may perform training of one or more machine learning models, e.g., the term model, the embeddings model, the summary model, the neighborhood model, and the combination model. The machine learning models may be trained independently or in conjunction with each other. When trained in conjunction with each other, error identified from the output of the combination model may be back propagated to updates to the other models, e.g., the term model, the embeddings model, the summary model, and the neighborhood model.

Training may include receiving a training input. The training input may be loaded from a repository and input to the models being trained. The training input may include previous examples of inputs processed by the models.

Training may further include combining the training input with a set of parameters of the one or more machine learning models to generate a training output. Combining the parameters with the inputs may include multiplying the parameters to the inputs and summing the products of the multiplication to generate outputs. Each of the machine learning models may include multiple layers that may be sequentially executed using outputs from previous layers. The output of the funnel layer may form the training output.

Training may further include comparing the training output to expected output to generate updates to the one or more machine learning models. The comparison of the training output to the expected output may be performed with a loss function. The loss function may identify the error between the training output and the expected output. The error may then be back propagated to the different models and layers to update each of the parameters of the model, which may be proportional to the influence of the parameter on the training output.

Training may further include incorporating the updates into the one or more machine learning models. Multiple updates may be batched together before being incorporated into the machine learning models. The training may continue until the accuracy of the model converges with a desired accuracy. For example, the desired accuracy may be 0.9 so that 90% of training outputs (i.e., pages) should accurately identify the presence of a table identified by the user.

Figure 4:
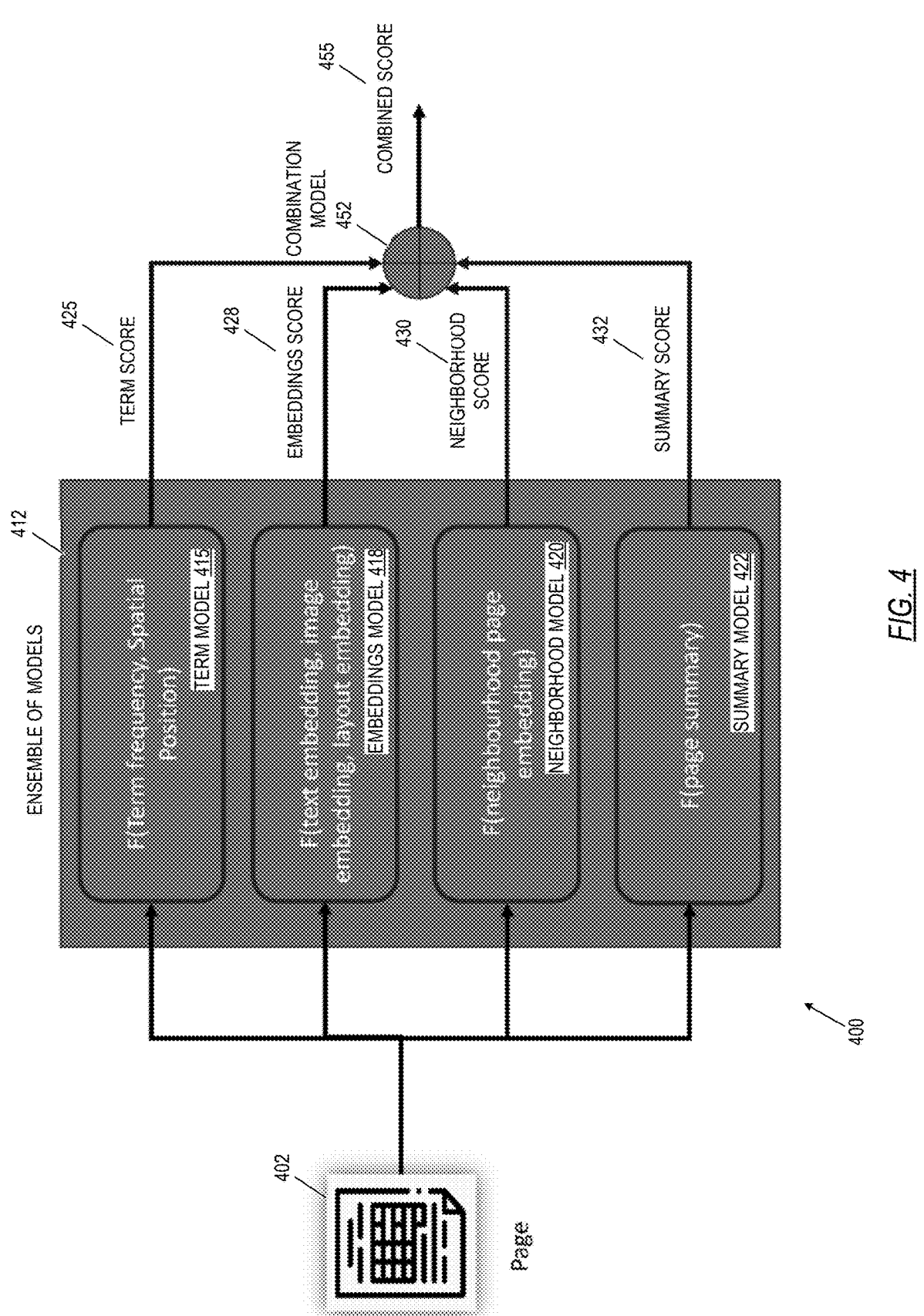
FIG. 4, FIG. 5, FIG. 6, FIG. 7, and FIG. 8 show examples in accordance with one or more embodiments of the disclosure.

Turning to FIG. 4, an example workflow (400) is illustrated for an example in accordance with the disclosure. The workflow (400) processes the page (402) with the ensemble model (412) to generate the combined score (455).

The page (402) is a page of a document that may include tabular content. The page (402) is input to the ensemble of models (412).

The ensemble of models (412) is a collection of models, which may include multiple machine learning models, that are used to process the page (402) to generate the combined score (455). The ensemble of models (412) includes the term model (415), the embeddings model (418), the neighborhood model (420), and the summary model (422). The models of the ensemble models (412) output the terms score (425), the embeddings score (428), the neighborhood score (430), and the summary score (432).

The term model (415) is a model of the ensemble of models (412). The term model (415) receives the page (402) and generates the terms score (425) as a function of the term frequency and spatial position of the terms in the table of the page (402) that match to the terms in the attributes that identify the table type selected by the user.

The embeddings model (418) is one of the ensemble of models (412). The embeddings model (418) processes the page (402) to generate the embeddings score (428) as a function of text embeddings, image embeddings, and layout embeddings. The text embeddings, image embeddings, and layout embeddings are sequences of embedding vectors generated from the page (402) using a text embeddings model, an image embeddings model, and a layout embeddings model.

The neighborhood model (420) is one of the ensemble of models (412). The neighborhood model (420) processes the page (402) to generate the neighborhood score (430) as a function of neighborhood page embeddings. The neighborhood page embeddings are collections of embedding vectors for other pages that are near, adjacent, or contiguous with the page (402).

The summary model (422) is one of the ensemble of models (412). The summary model processes the page (402) to generate the summary score (432) as a function of a page summary. The page summary may be generated with a language model to which the page (402) is input.

The term score (425), the embeddings score (428), the neighborhood score (430), and the summary score (432) may each be normalized outputs from the ensemble of models (412) that identify whether the page (402) includes a table of the table type specified by the user. As an example, each of the scores (425), (428), (430), and (432) may have a scalar value from zero to one to indicate that the page (402) includes the table of the table type (with a value of one) or does not include a table of the table type (with a score of zero). The term score (425), the embeddings score (428), the neighborhood score (430), and the summary score (432) are input to the combination model (452).

The combination model (452) processes the output from the ensemble of models (412) to generate the combined score (455). The combination model (452) may be a neural network model, e.g., a perceptron model, which may be trained in conjunction with the training of one or more of the machine learning models used in the ensemble of models (412). The combination model (452) outputs the combined score (455).

The combined score (455) is the output of the combination model (452). The combined score may be a scalar value that indicates whether the page (402) includes a table of the table type specified by the user.

Figure 5:
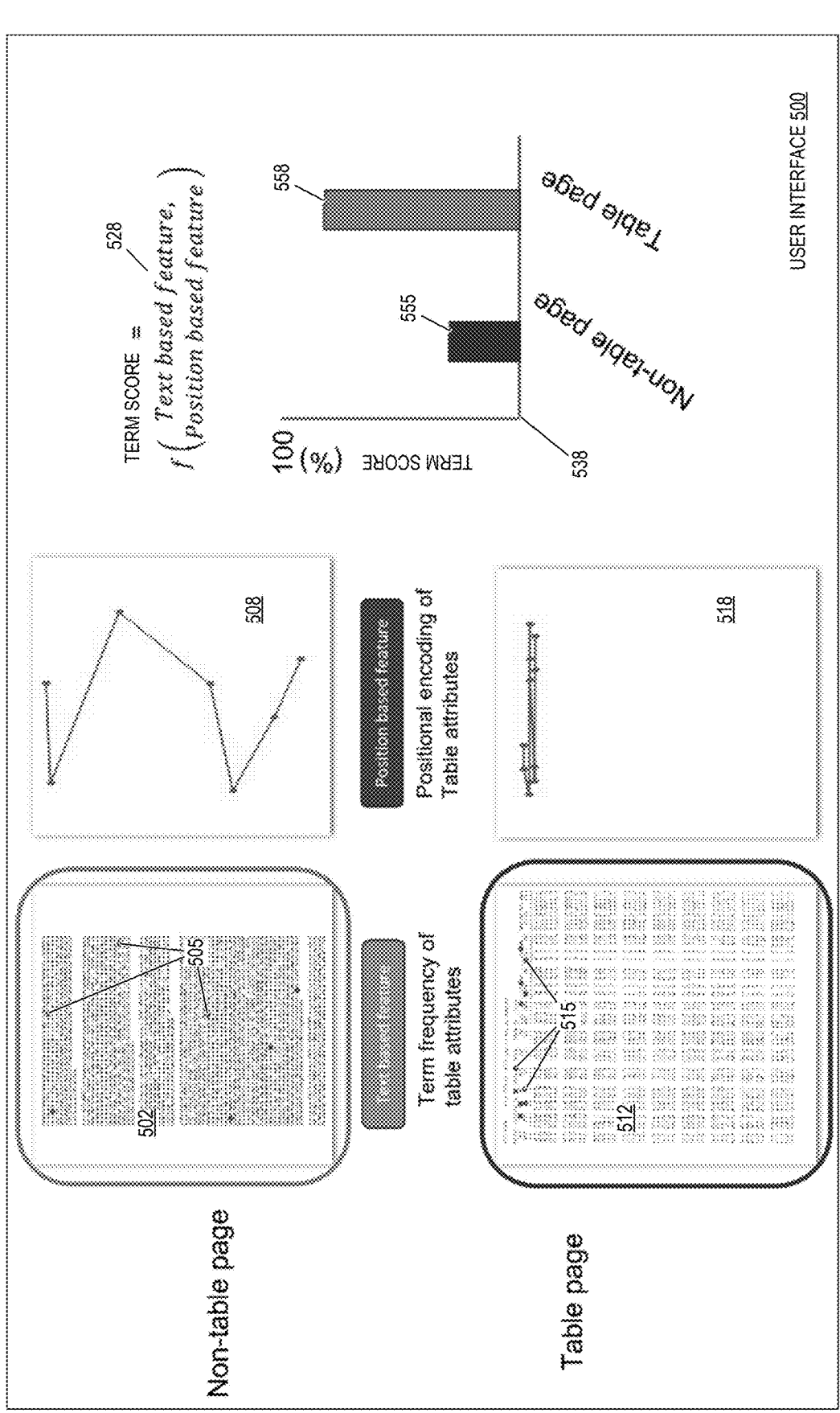

Turning to FIG. 5, in accordance with an example of the disclosure, the user interface (500) may display the pages, features, term scores, and graph for pages from a document. The pages (502) and (512) illustrate operation of a term model to generate term scores. The non-table page (502) and the table page (512) are processed with the same model to generate the term scores (555) and (558). The non-table page (502) includes the text based features (505), which are terms that match to the terms in the attributes of the table type specified by the user. For table page (512), the text based features (515) match to the terms of the table type specified by the user.

The position based features (508) are generated from the text based features (505) from the non-table page (502). The position based features (508) may be generated directly from the non-table page (502). The position based features (518) are generated from the text based features (515) from the table page (512). The position based features (518) may be generated directly from the table page (512). As an example, the position based features (508) may include a spread of y-coordinates of the locations of attributes. In that case, the position based features (508) of the non-table page (502) may be greater in value than the position based features (518) for the table page. Other position based features using coordinate positions of attributes in the page image may be used, such as one or more of the variance of x coordinates and the variance of y coordinates of the locations of attributes.

The function (528) indicates that the term score, for either the non-table page (502) or the table page (512), is generated as a function of the text based features and the position based features for the respective pages. When the function (528) is executed with the text based features (505) and the position based features (508) for the page (502), the term score (555) is the result. Executing the function (528) for the term score with the text based features (515) and the position based features (518) for the table page (512) generates the term score (558).

The graph (538) displays the term scores (555) and (558) for the pages (502) and (512). The graph (538) shows the relative value of the term scores (555) and (558) to show that the term score (555) for the non-table page (502) is lower than the term score (558) for the table page (512)

Figure 6:
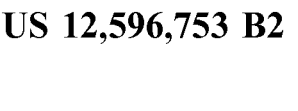

Turning to FIG. 6, operation of the embeddings model (618) is illustrated for an example of the disclosure. The workflow (600) processes the page (602) to generate the embeddings score (652) using the embeddings model (618). The embeddings model (618) processes the page (602) to generate the embeddings score (652).

The embeddings model (618) is a collection of multiple models that processes the page (602) to generate features that are combined to generate the embeddings score (652). The embeddings model (618) may process the page (602) to generate the page text (612) and the page image (615).

The page text (612) is generated from the page (602). The page text may be generated with an optical character recognition model that identifies text from a visual image of the page (602). The page text (612) is input to the text model (622). The page text (612) may also include the text of the attributes that describes the table type selected by the user of the system.

The page image (615) is generated from the page (602). The page image (615) may be generated by rendering the page (602) to a visual image. The page image (615) is input to the image model (625) and to the layout model (628).

The text model (622) is a deep neural network that uses neural network algorithms to process the page text (612). The text model (622) processes the page text (612) to generate text embeddings that are processed by the classifier (632).

The image model (625) is a vision based deep neural network. The image model (625) processes the page image (615) to generate image embeddings as an output which are input to the classifier (632).

The layout model (628) is a deep neural network that is layout based to provide output related to the structure and layout of the content within the page (602). The layout model (628) processes the page image (615) which is the same image processed by the image model (625), to output layout embeddings that are input to the classifier (632).

The classifier (632) processes the combined outputs from the text model (622), the image model (625) and the layout model (628) to generate the embeddings score (652). The outputs from the text model (622), the image model (625), and the layout model (628) may be appended to each other to form the input to the classifier (632). The classifier (632) may be a perceptron model that converts the multidimensional input of the classifier to a scalar output for the embeddings score (652).

The embeddings score (652) is the output for the classifier (632). The embeddings score (652) is an indication of whether the page (602) includes a table of the table type specified by a user of the system.

Figure 7:
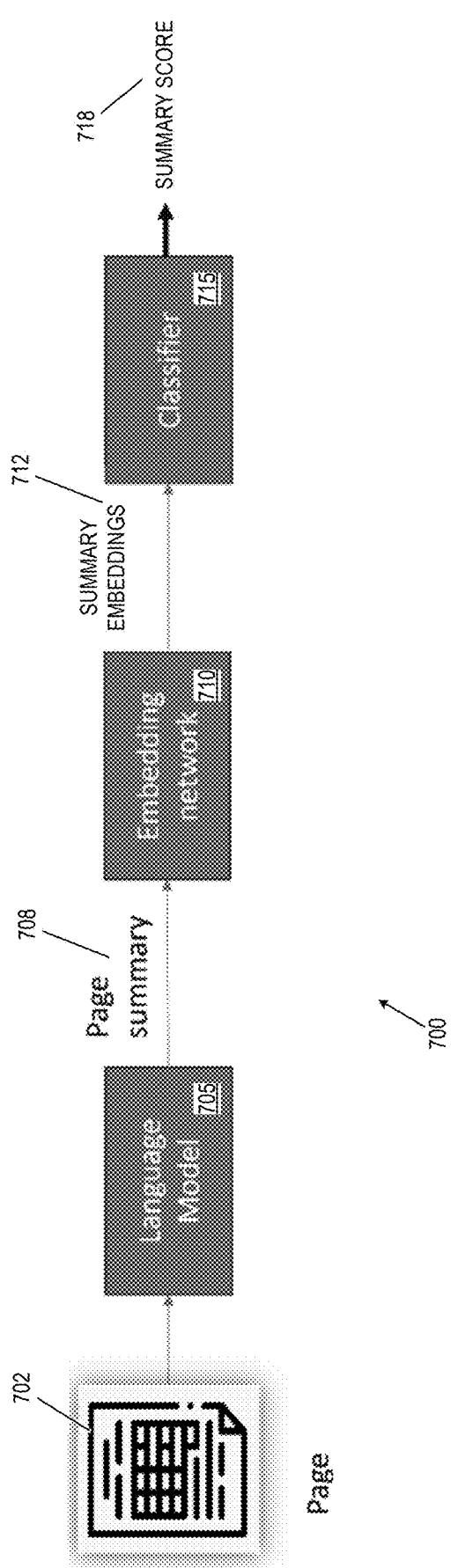

Turning to FIG. 7, the workflow (700) is illustrated for an example of the disclosure. The workflow (700) processes the page (702) to generate the summary score (718). The workflow (700) may be performed with a summary model.

The page (702) is a page from a document. The page (702) may include a table which may be of the table type specified by the user of the system. The page (702) is input to the language model (705).

The language model (705) is a natural language model that may receive text and output text. The input to the language model (705) may be a prompt that includes the page (702) with instructions to generate the page summary (708). The output of the language model (705) is the page summary (708).

The page summary (708) is output from the language model (705). The page summary (708) summarizes the content of the text within the page (702). The page summary (708) is input to the embeddings network (710).

The embedding network (710) receives the page summary (708). The embedding network (710) processes the page summary (708) to generate the summary embeddings (712). The embedding network (710) may be a different embedding network than that used by the language model (705) to convert the text from the page (702) to embeddings that are processed with the language model (705).

The summary embeddings are output from the embedding network (710). The summary embeddings (712) are embeddings vectors for the words from the page summary (708). The embedding vectors project the words from the page summary (708) to a latent space in which the locations within the latent space may identify the natural language meaning of the words. The summary embeddings (712) are input to the classifier (715). The classifier (715) processes the summary embeddings (712) to generate the summary score (718). The classifier (715) may be a perceptron model that generates a scalar output from multidimensional input.

The summary score (718) is output from the classifier (715). The summary score (718) may be a scalar value that identifies whether the page (702) includes a table of the table type selected by the user of the system.

Figure 8:
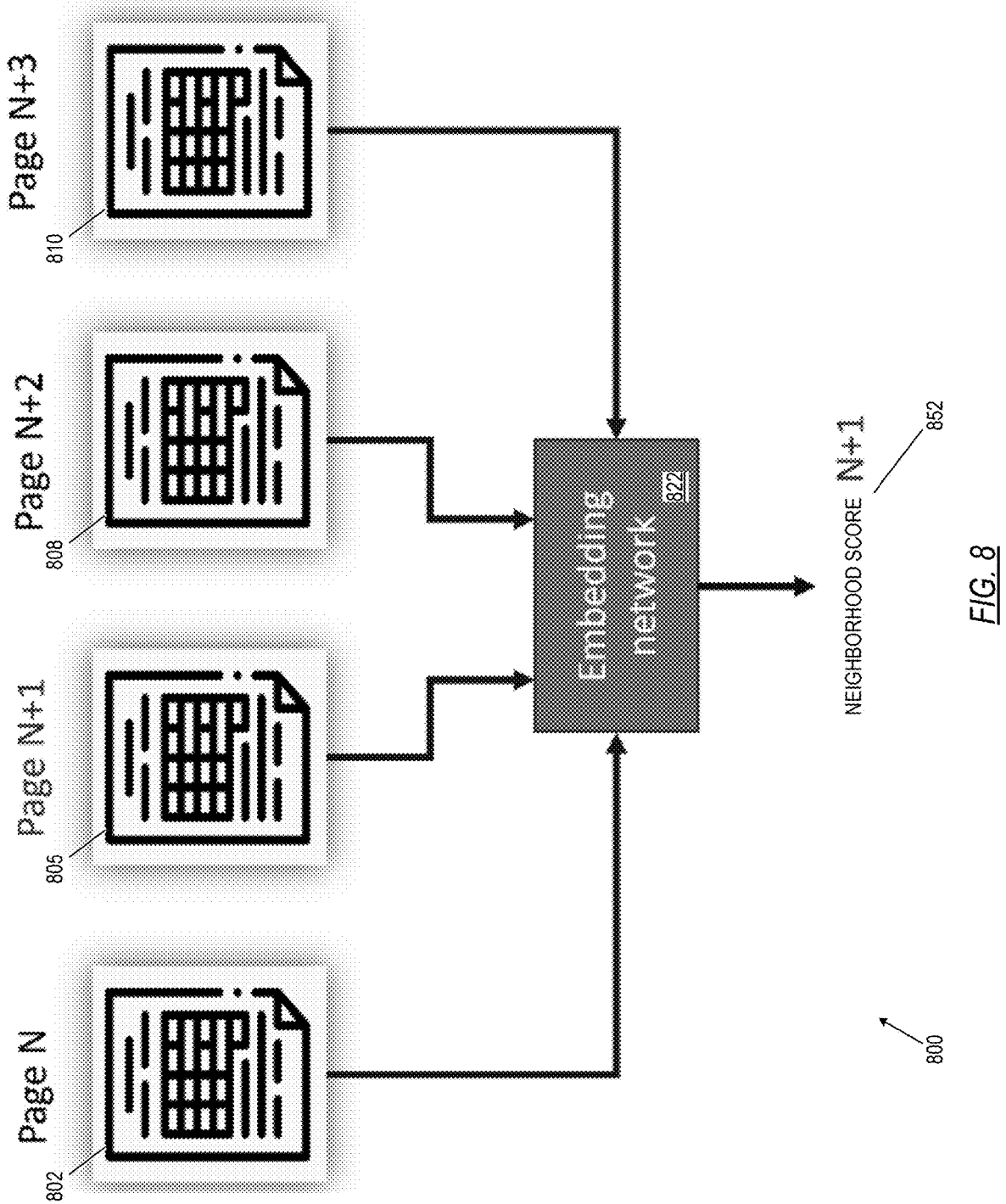

Turning to FIG. 8, the workflow (800) illustrates the flow of data through a neighborhood model for an example of the disclosure. The workflow (800) processes the pages (802) through (810) to generate the neighborhood score (852).

The pages (802), (805), (808), and (810) are pages from a document that are contiguous and adjacent to each other. The page (805) is a page that is being processed by other models in the system (e.g., by a term model, by an embeddings model, by a summary model, etc.) The page (805) may be the current page, with the page (802) being a previous page and the pages (808) and (810) being subsequent pages to the page (805). Different window sizes may be used with the different numbers of pages before or after the current page. Each of the pages (802) through (810) may include a table of the table type specified by the user of the system. The pages (802) through (810) are input to the embedding network (822).

The embedding network (822) may be a collection of models that processes each of the pages (802) through (810) to generate the neighborhood score (852). The embedding network (822) may include the other models used by the system to generate embeddings for each of the pages (802) through (810) which are then combined to form the neighborhood score (852). The neighborhood score (852) is the output from the embedding network (822). The neighborhood score (852) corresponds to the page (805). The neighborhood score (852) may be a scalar value that identifies whether the page (802) includes a table of the table type selected by the user of the system based on the neighborhood of the page (802).

Embodiments may be implemented on a special purpose computing system specifically designed to achieve the improved technological result. Turning to FIG. 9A and FIG. 9B, the special purpose computing system (900) may include one or more computer processors (902), non-persistent storage (904), persistent storage (906), a communication interface (912) (e.g., Bluetooth interface, infrared interface, network interface, optical interface, etc.), and numerous other elements and functionalities that implement the features and elements of the disclosure. The computer processor(s) (902) may be an integrated circuit for processing instructions. The computer processor(s) may be one or more cores or micro-cores of a processor. The computer processor(s) (902) includes one or more processors. The one or more processors may include a central processing unit (CPU), a graphics processing unit (GPU), a tensor processing unit (TPU), combinations thereof, etc.

The input devices (910) may include a touchscreen, keyboard, mouse, microphone, touchpad, electronic pen, or any other type of input device. The input devices (910) may receive inputs from a user that are responsive to data and messages presented by the output devices (908). The inputs may include text input, audio input, video input, etc., which may be processed and transmitted by the computing system (900) in accordance with the disclosure. The communication interface (912) may include an integrated circuit for connecting the computing system (900) to a network (not shown) (e.g., a local area network (LAN), a wide area network (WAN) such as the Internet, mobile network, or any other type of network), and/or to another device, such as another computing device.

Further, the output device(s) (908) may include a display device, a printer, external storage, or any other output device. One or more of the output device(s) (908) may be the same or different from the input device(s) (910). The input (910) and output device(s) (908) may be locally or remotely connected to the computer processor(s) (902). Many different types of computing systems exist, and the aforementioned input (910) and output device(s) (908) may take other forms. The output device(s) (908) may display data and messages that are transmitted and received by the computing system (900). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (900) in FIG. 9A may be connected to or be a part of a network. For example, as shown in FIG. 9B, the network (920) may include multiple nodes (e.g., node X (922) and node Y (924)). Each node may correspond to a computing system, such as the computing system shown in FIG. 9A, or a group of nodes combined may correspond to the computing system shown in FIG. 9A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

The nodes (e.g., node X (922) and node Y (924)) in the network (920) may be configured to provide services for a client device (926), including receiving requests and transmitting responses to the client device (926). For example, the nodes may be part of a cloud computing system. The client device (926) may be a computing system, such as the computing system shown in FIG. 9A. Further, the client device (926) may include and/or perform all or a portion of one or more embodiments of the disclosure.

The computing system of FIG. 9A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or a semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an "or" may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above may be devised which do not depart from the scope of the claims as disclosed herein. Accordingly, the scope should be limited only by the attached claims.

What is claimed is:

1. A method comprising:

receiving a table type data associated with a portion of a plurality of documents, wherein the table type data comprises one or more attributes related to one or more columns of a table type;

executing a term model using frequency features and positioning features extracted from a page of a document to generate a term score of the page, wherein executing the term model comprises:

determining a first frequency of the frequency features based on a term of the one or more attributes appearing in the page of the document;

determining a second frequency of the frequency features, wherein the second frequency is associated with an inverse document frequency determined based on a presence of the term within the plurality of documents;

determining the positioning features of the term in the page based on coordinates of the term within the page; and determining the term score of the page for the term based on the first frequency, the second frequency, and the positioning features;

executing an embeddings model using text embeddings, image embeddings, and layout embeddings to generate an embeddings score of the page, wherein executing the embeddings model comprises:

generating attribute embeddings based on the one or more attributes; and generating the embeddings score based on a comparison between the attribute embeddings to the text embeddings, the image embeddings, and the layout embeddings;

executing a summary model using a page summary generated with a language model to generate a summary score of the page;

executing a neighborhood model using a set of pages from the document to generate a neighborhood score of the page;

executing a combination model using the term score, the embeddings score, the summary score, and the neighborhood score to generate a combined score of the page, wherein the combined score corresponds to a likelihood the page includes a table of the table type; and presenting the combined score to indicate the page includes the table of the table type, wherein the combined score is presented with the page via a display of a computing device.

2. The method of claim 1, further comprising:

extracting the page from the document to a page image; and extracting page text from the page image.

3. The method of claim 1, wherein executing the embeddings model comprises:

executing a text model using page text to extract the text embeddings from the page;

executing an image model using a page image to extract the image embeddings from the page;

executing a layout model using the page image to extract the layout embeddings from the page; and executing an embeddings score model with the text embeddings, the image embeddings, and the layout embeddings to generate the embeddings score.

4. The method of claim 1, wherein executing the summary model comprises:

executing the language model with page text to generate the page summary; and executing a summary score model with the page summary to generate the summary score.

5. The method of claim 1, wherein executing the neighborhood model comprises:

selecting the set of pages from the document;

executing a neighborhood embeddings model with the set of pages to generate a set of neighborhood page embeddings; and executing a neighborhood score model with the set of neighborhood page embeddings to generate the neighborhood score.

6. The method of claim 1, wherein receiving the table type data comprises:

receiving a schema defining a set of attributes of the table type.

7. The method of claim 1, wherein receiving the table type data comprises:

receiving a natural language query identifying a set of attributes of the table type.

8. The method of claim 1, further comprising:

training one or more machine learning models comprising the term model, the embeddings model, the summary model, the neighborhood model, and the combination model by:

receiving a training input;

combining the training input with a set of parameters of the one or more machine learning models to generate a training output;

comparing the training output to expected output to generate updates to the one or more machine learning models; and incorporating the updates into the one or more machine learning models.

9. The method of claim 1, wherein executing the summary model comprises:

generating the embeddings score for the page based on the text embeddings generated with a text model;

generating a prompt for the language model based on the text embeddings and the embeddings score;

generating a summary of the page based the language model using the prompt; and generating the summary score of the page based on the summary.

10. The method of claim 1, wherein the neighborhood model comprises a perceptron model configured to combine a set of neighborhood page embeddings using one or more sequential perceptron layers to generate a scalar output.

11. A system comprising:

at least one processor; and an application that, when executing on the at least one processor, performs operations comprising:

receiving a table type data associated with a portion of a plurality of documents, wherein the table type data comprises one or more attributes related to one or more columns of a table type;

executing a term model using frequency features and positioning features extracted from a page of a document to generate a term score of the page, wherein executing the term model comprises:

determining a first frequency of the frequency features based on a term of the one or more attributes appearing in the page of the document;

determining a second frequency of the frequency features, wherein the second frequency is associated with an inverse document frequency determined based on a presence of the term within the plurality of documents;

determining the positioning features of the term in the page based on coordinates of the term within the page; and determining the term score of the page for the term based on the first frequency, the second frequency, and the positioning features;

executing an embeddings model using text embeddings, image embeddings, and layout embeddings to generate an embeddings score of the page, wherein executing the embeddings model comprises:

generating attribute embeddings based on the one or more attributes; and generating the embeddings score based on a comparison between the attribute embeddings to the text embeddings, the image embeddings, and the layout embeddings;

executing a summary model using a page summary generated with a language model to generate a summary score of the page;

executing a neighborhood model using a set of pages from the document to generate a neighborhood score of the page;

executing a combination model using the term score, the embeddings score, the summary score, and the neighborhood score to generate a combined score of the page, wherein the combined score corresponds to a likelihood the page includes a table of the table type; and presenting the combined score to indicate the page includes the table of the table type, wherein the combined score is presented with the page via a display of a computing device.

12. The system of claim 11, wherein the application performs operations further comprising:

extracting the page from the document to a page image; and extracting page text from the page image.

13. The system of claim 11, wherein executing the embeddings model comprises:

executing a text model using page text to extract the text embeddings from the page;

executing an image model using a page image to extract the image embeddings from the page;

executing a layout model using the page image to extract the layout embeddings from the page; and executing an embeddings score model with the text embeddings, the image embeddings, and the layout embeddings to generate the embeddings score.

14. The system of claim 11, wherein executing the summary model comprises:

executing the language model with page text to generate the page summary; and executing a summary score model with the page summary to generate the summary score.

15. The system of claim 11, wherein executing the neighborhood model comprises:

selecting the set of pages from the document;

executing a neighborhood embeddings model with the set of pages to generate a set of neighborhood page embeddings; and executing a neighborhood score model with the set of neighborhood page embeddings to generate the neighborhood score.

16. The system of claim 11, wherein receiving the table type data comprises:

receiving a schema defining a set of attributes of the table type.

17. The system of claim 11, wherein receiving the table type data comprises:

receiving a natural language query identifying a set of attributes of the table type.

18. The system of claim 11, wherein the language model comprises a pretrained model configured to accept input as a first set of embeddings and a second set of embeddings.

19. The system of claim 11, wherein the neighborhood model comprises a perceptron model configured to combine a set of neighborhood page embeddings using one or more sequential perceptron layers to generate a scalar output.

20. A non-transitory computer readable medium comprising instructions executable by at least one processor to perform operations comprising:

receiving a table type data associated with a portion of a plurality of documents, wherein the table type data comprises one or more attributes related to one or more columns of a table type;

executing a term model using frequency features and positioning features extracted from a page of a document to generate a term score of the page, wherein executing the term model comprises:

determining a first frequency of the frequency features based on a term of the one or more attributes appearing in the page of the document;

determining a second frequency of the frequency features, wherein the second frequency is associated with an inverse document frequency determined based on a presence of the term within the plurality of documents;

determining the positioning features of the term in the page based on coordinates of the term within the page; and determining the term score of the page for the term based on the first frequency, the second frequency, and the positioning features;

executing an embeddings model using text embeddings, image embeddings, and layout embeddings to generate an embeddings score of the page, wherein executing the embeddings model comprises:

generating attribute embeddings based on the one or more attributes; and generating the embeddings score based on a comparison between the attribute embeddings to the text embeddings, the image embeddings, and the layout embeddings;

executing a summary model using a page summary generated with a language model to generate a summary score of the page;

executing a neighborhood model using a set of pages from the document to generate a neighborhood score of the page;

executing a combination model using the term score, the embeddings score, the summary score, and the neighborhood score to generate a combined score of the page, wherein the combined score corresponds to a likelihood the page includes a table of the table type; and presenting the combined score to indicate the page includes the table of the table type, wherein the combined score is presented with the page via a display of a computing device.

* * * * *